(12) United States Patent
Halcrow et al.

(10) Patent No.: US 7,450,109 B2
(45) Date of Patent: Nov. 11, 2008

(54) ELECTRONIC WHITEBOARD

(75) Inventors: Michael Austin Halcrow, Austin, TX (US); Kylene Jo Hall, Austin, TX (US); Dustin C. Kirkland, Austin, TX (US); Herman Rodriguez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 597 days.

(21) Appl. No.: 10/889,783

(22) Filed: Jul. 13, 2004

(65) Prior Publication Data

US 2006/0012561 A1    Jan. 19, 2006

(51) Int. Cl.
*G06F 3/041* (2006.01)
(52) U.S. Cl. .................................................. 345/173
(58) Field of Classification Search ............... 345/30, 345/173, 207
See application file for complete search history.

(56) References Cited

U.S. PATENT DOCUMENTS

| | | | | |
|---|---|---|---|---|
| 4,777,329 | A | | 10/1988 | Mallicoat ........................ 178/18 |
| 5,455,906 | A | * | 10/1995 | Usuda ........................... 345/536 |
| 5,717,939 | A | | 2/1998 | Bricklin et al. |
| 6,353,193 | B1 | | 3/2002 | Atwood et al. ............ 178/20.02 |
| 6,476,834 | B1 | | 11/2002 | Doval et al. |
| 6,744,426 | B1 | * | 6/2004 | Okamoto et al. ............. 345/179 |
| 7,139,617 | B1 | * | 11/2006 | Morgan et al. ................. 700/17 |
| 2002/0008692 | A1 | | 1/2002 | Omura et al. |
| 2002/0050985 | A1 | * | 5/2002 | Takekawa et al. ............ 345/173 |
| 2003/0063072 | A1 | | 4/2003 | Brandenberg et al. |
| 2004/0130776 | A1 | * | 7/2004 | Ho et al. ....................... 359/296 |
| 2005/0062725 | A1 | * | 3/2005 | Shih ............................. 345/173 |
| 2005/0264472 | A1 | * | 12/2005 | Rast .............................. 345/30 |
| 2006/0097989 | A1 | * | 5/2006 | Ho ................................ 345/173 |

OTHER PUBLICATIONS

*MIMIO*, by Infology, Jun. 9, 2004.

* cited by examiner

*Primary Examiner*—Richard Hjerpe
*Assistant Examiner*—Shaheda A Abdin
(74) *Attorney, Agent, or Firm*—Volel Emile; Diana R. Gerhardt; Mark E. McBurney

(57) ABSTRACT

An improved electronic whiteboard is provided. The improved electronic whiteboard includes a plurality of toggle switches along a vertical side for drawing vertical straight lines across the electronic whiteboard and a plurality of toggle switches along a horizontal side for drawing horizontal straight lines across the electronic whiteboard. When some or all the switches along the vertical side are turned on, vertical straight lines are drawn across the electronic whiteboard. Likewise, when some or all the switches along the horizontal side are turned on, horizontal straight lines are drawn across the electronic whiteboard. The intersections of the vertical straight lines with the horizontal straight lines form a plurality of grid cells. The electronic whiteboard contains means for determining the location of these cells.

12 Claims, 7 Drawing Sheets

| PLATFORM | TEST 1 | TEST 2 |
|----------|--------|--------|
| X | PASS | PASS |
| Z | N/A | PASS |
| I | FAIL | PASS |
| P | N/A | PASS |
| OPT | FAIL | FAIL |

SEARCH 5
FILE 8
CLOSE 3

FIG. 3

ELECTRONIC WHITEBOARD

CROSS-REFERENCE TO RELATED APPLICATIONS

This application is related to U.S. patent application Ser. No. 10/889,782, entitled Apparatus, system and method of importing data arranged in a table on an electronic whiteboard into a spreadsheet, filed on even date herewith and assigned to the common assignee of this application, the disclosure of which is herein incorporated by reference.

BACKGROUND OF THE INVENTION

1. Technical Field

The present invention is directed to electronic whiteboards. More specifically, the present invention is directed to an improved electronic whiteboard.

2. Description of Related Art

Whiteboards have been steadily replacing blackboards/chalkboards. A whiteboard is a white laminate display panel on which a user may write. Generally, a user writes on a whiteboard using a pen containing quickly drying ink that can easily be erased. Thus, like a chalkboard, a whiteboard may be used indefinitely.

With the advent and ubiquity of computers, it was inevitable that whiteboards and computers would be combined together. A whiteboard combined with a computer is referred to as an electronic whiteboard. An electronic whiteboard digitally records images and/or text written thereon to be later printed out, reviewed, and/or transmitted. The digitally recorded images and/or text, however, is in the form of a bitmap image rather than in computer-readable code (e.g., ASCII code). Further, if the images and/or text is arranged in a table or chart on the electronic whiteboard, grid cells of the table or chart may not be machine-detectable.

Hence, what is needed is an improved electronic whiteboard with machine-detectable grid cells.

SUMMARY OF THE INVENTION

The present invention provides an improved electronic whiteboard. The improved electronic whiteboard includes a plurality of toggle switches along a vertical side for drawing or marking horizontal straight lines across the electronic whiteboard and a plurality of toggle switches along a horizontal side for drawing or marking vertical straight lines across the electronic whiteboard. When some or all the switches along the vertical side are turned on, horizontal straight lines are drawn or marked across the electronic whiteboard. Likewise, when some or all the switches along the horizontal side are turned on, vertical straight lines are drawn or marked across the electronic whiteboard. Sets of intersections of the vertical straight lines with the horizontal straight lines form a plurality of grid cells. The electronic whiteboard contains means for determining the location of these cells.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 depicts the exemplary whiteboard of FIG. 2 with information-filled cells.

DETAILED DESCRIPTION OF THE PREFERRED EMBODIMENT

The present invention provides an apparatus, system and method of improving an electronic whiteboard. The invention or part thereof may reside on any data storage medium (i.e., floppy disk, compact disk, hard disk, ROM, RAM, etc.) used by a computer system.

The electronic whiteboard of the present invention may utilize optical technology (e.g., laser, infrared or LED technology) to create grid lines in order to facilitate table or chart data entry. Particularly, the electronic whiteboard may include two surfaces between which a chamber containing a gaseous substance (such as carbon dioxide) with light-reflecting particles may be located. Note that although carbon dioxide may be used, the invention is not thus restricted. Any other gas or substance may be used so long as light may be reflected therefrom.

Toggle switches that may turn on/off adjacent lasers, for example, may be located along a vertical side and a horizontal side of the whiteboard. The vertical and horizontal lasers (or laser apparatus) may be mounted on a movable platform that moves or slides along the corresponding axis, and allows for placement of the laser beam at desired locations. When a laser is activated, the light from the laser may become visible as a straight line when reflected off the particles in the gas. Hence, by activating proper lasers at the vertical and horizontal edges of the whiteboard, a user may construct an appropriate grid into which information may be entered.

Alternatively, a user, using a pen, may draw a set of intersecting vertical and horizontal lines on the whiteboard to form a grid. Before inserting any data into any one of the grid cells, the user may instruct the electronic whiteboard to scan in the grid cells. After doing so, the platform may be moved in a position such that each laser beam from the platform corresponds to a pen drawn line on the electronic whiteboard.

Figure 1:
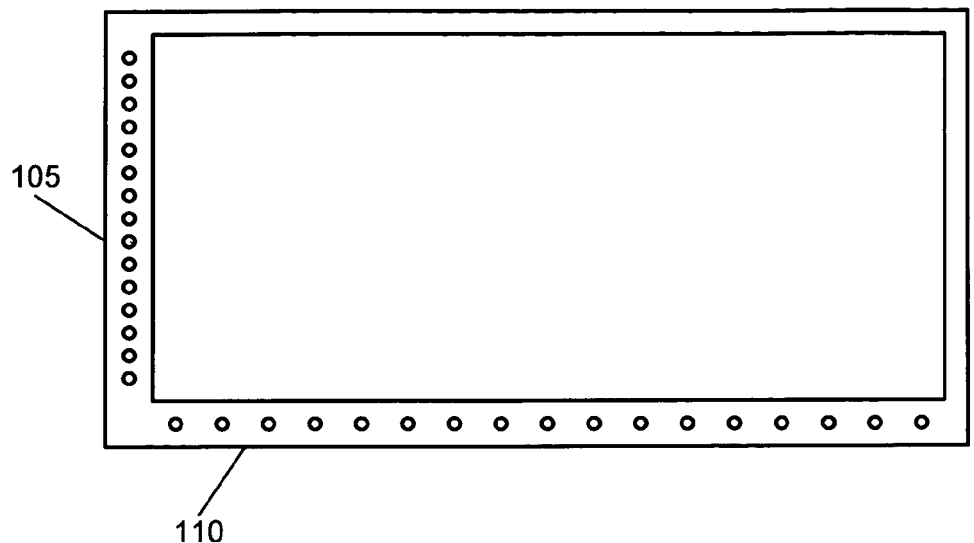
FIG. 1 depicts an exemplary whiteboard of the present invention.

With reference now to the figures, FIG. 1 depicts an exemplary whiteboard of the present invention. The whiteboard contains a column of buttons along vertical edge 105 and a row of buttons along horizontal edge 110. The buttons are used to activate adjacent lasers. That is, when a button is depressed, a laser adjacent to the button is turned on and emits a light that appears as a straight line across the whiteboard. The depressed button may also be lit to indicate that the laser is on or the button is depressed. This is shown in FIG. 2.

Figure 2:
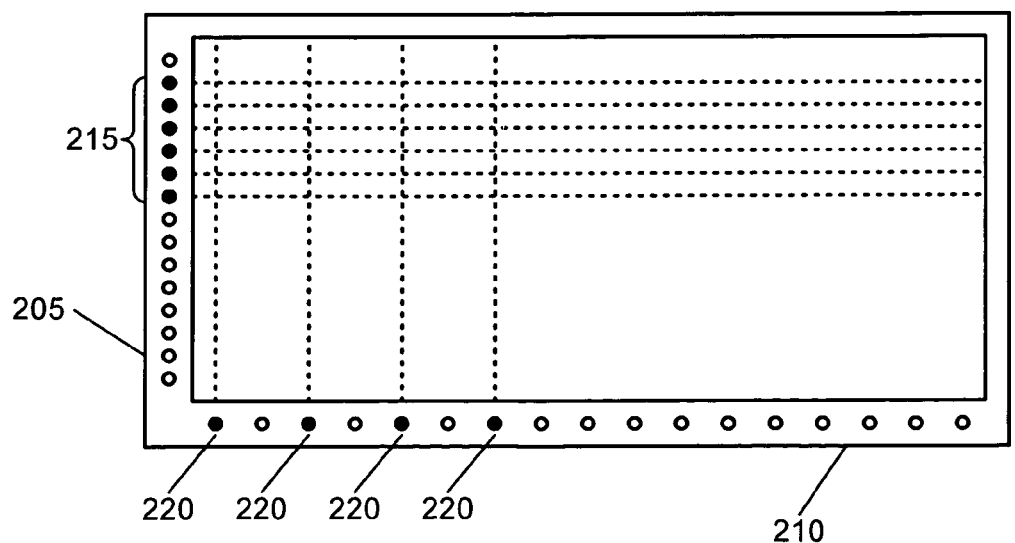
FIG. 2 depicts the exemplary whiteboard of FIG. 1 with activated lasers.

FIG. 2 depicts the exemplary whiteboard of FIG. 1 with activated lasers. In the figure, buttons 115 along vertical edge 105 and buttons 120 along horizontal edge 110 are highlighted indicating that adjacent lasers placed thereby are activated. Further, straight lines (see the dotted lines) corresponding each to a highlighted button are visible across the whiteboard. These straight lines form a grid of cells within which information may be entered.

FIG. 3 depicts the exemplary whiteboard of FIG. 2 with information-filled cells. The information may be filled in by a user using a common white-board writing instrument.

Figure 4:
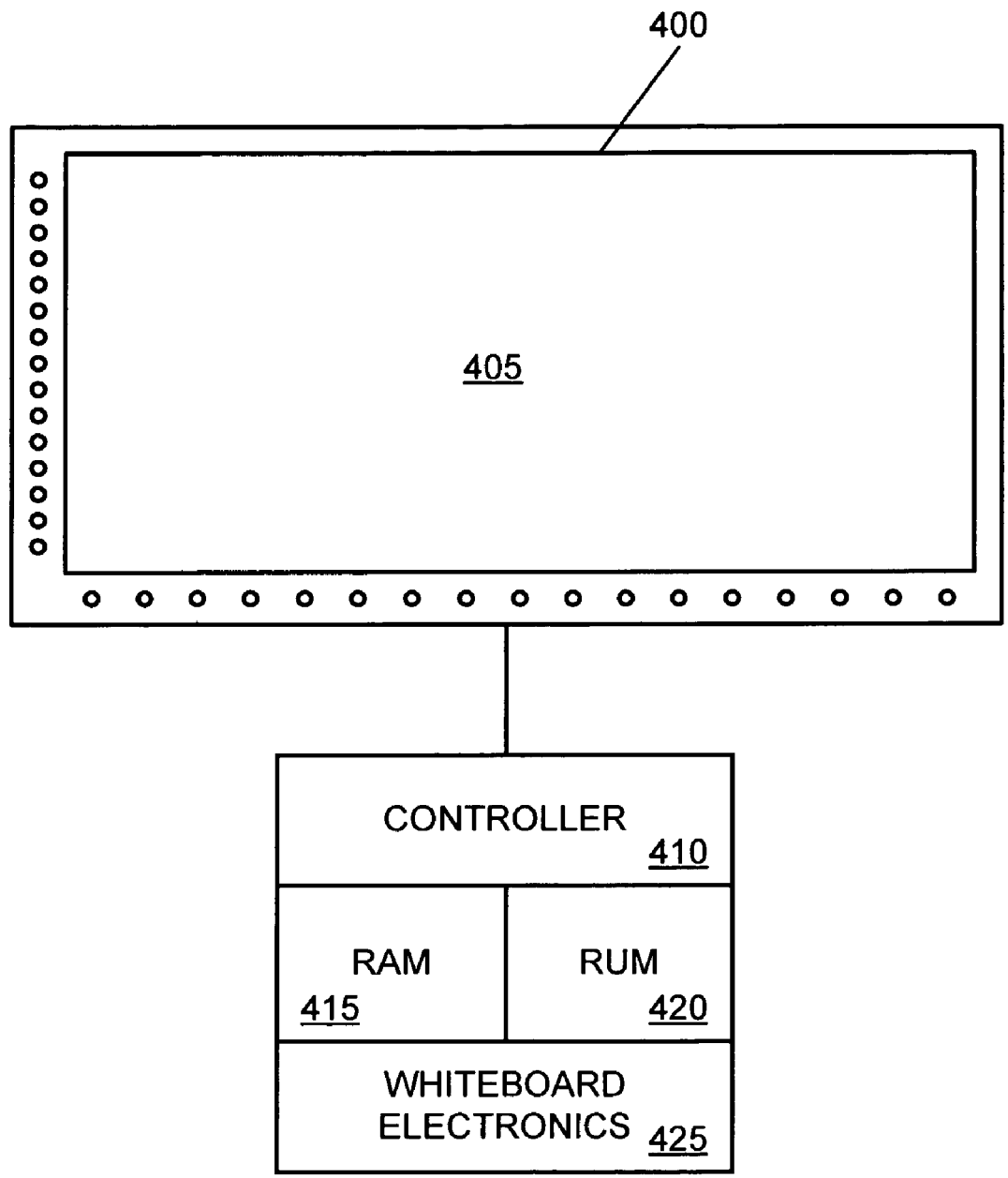
FIG. 4 is a block diagram showing the primary components of the electronic whiteboard system of the present invention.

FIG. 4 is a block diagram showing primary components of an electronic whiteboard system of the present invention. The electronic whiteboard system consists of a digitizer 400 that includes writing surface 405. Connected to digitizer 400 is controller 410 which includes RAM 415, ROM 420 and whiteboard electronics 425. Whiteboard electronics 425 is used to locate XY coordinates of markings on writing surface 405. Further, whiteboard electronics 425 keeps track of the toggle switches that are turned on or off, and if the light emitters are mounted on movable plates, the position of the light emitters. ROM 420 is used to store an executable or configuration file that may be used to properly control the whiteboard and RAM 415 is used to store data from the digitizer 400.

Figure 5:
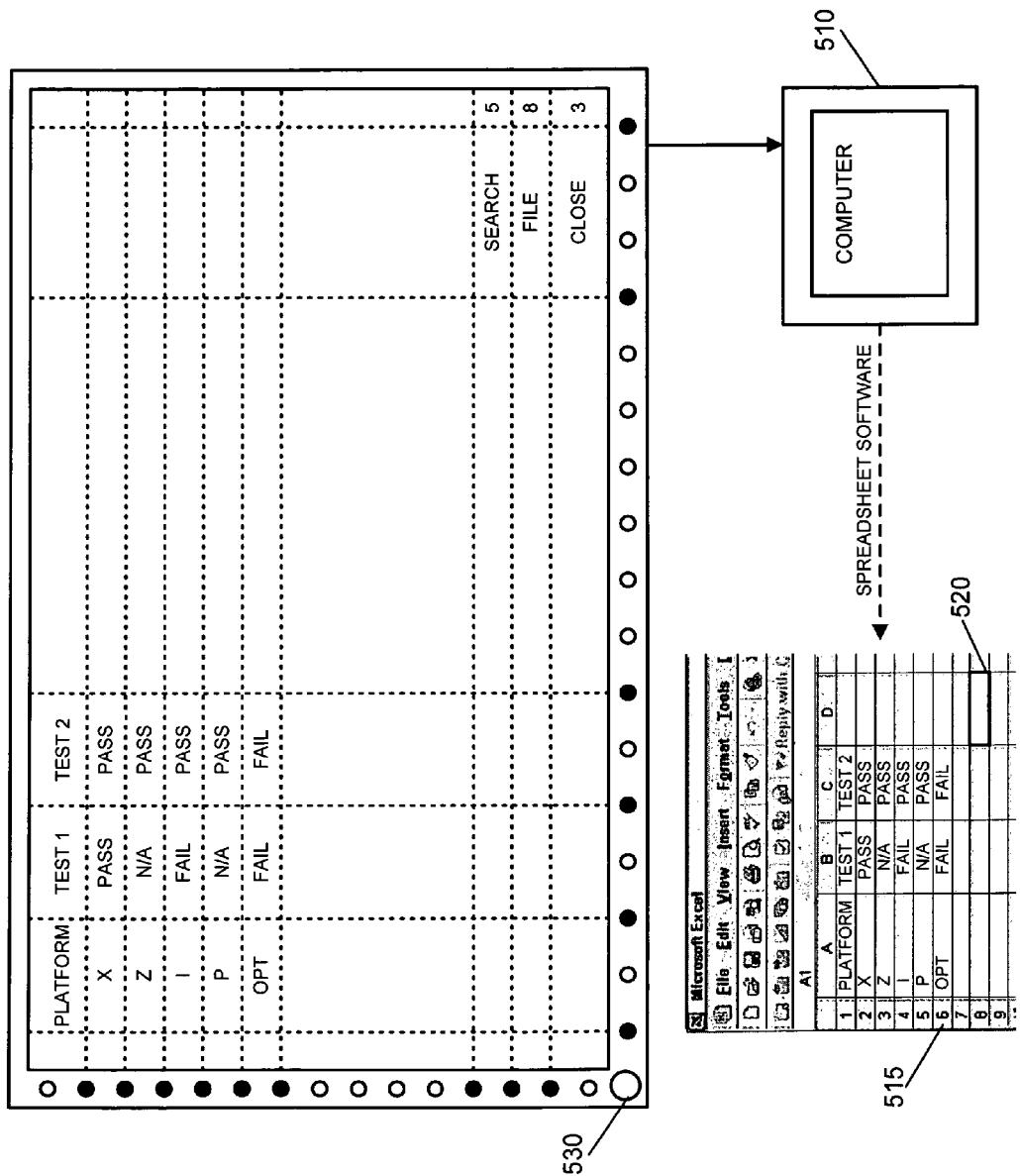
FIG. 5 depicts the exemplary whiteboard of FIG. 3 connected to a computer system.

FIG. 5 depicts the exemplary whiteboard of FIG. 3 connected to a computer system. The connection may be through a Universal Serial Bus (USB) or through a firewire adapter or through a Bluetooth adapter. Note that the invention is not restricted to only those technologies. Any other technology that may facilitate communication between any two or more computing devices, data download or upload from one system to another etc. may be used.

In operation, a user may enter information into the cells of the grid formed by the intersecting light emitters. After the information is entered, the user may download the information into computer system 510 by asserting button 530. When button 530 is asserted, the controller 410 of FIG. 4 may enable the digitizer 400 to scan in the information on the whiteboard surface 405. In one embodiment, the information may be scanned in real-time without having to assert button 530. Note that scanning information from a whiteboard into a computer is well known in the art and will not be explained.

As the digitizer is scanning the whiteboard surface 405, the XY coordinates of the cells may be recorded and stored in RAM 415. Further, the XY coordinates of each marking on the whiteboard may also be recorded and stored in RAM 415. This will enable the computer system 510 to determine the cells in which each marking was located on the whiteboard surface 405. All this information may be downloaded to the computer system 510.

Upon receiving the information, the computer system 510 may use an optical character recognition (OCR) program to convert bitmap images into computer-readable code. After doing so, the information (i.e., the XY coordinates of the cells, the XY coordinates of the converted characters as well as the converted characters) may be stored on the computer system 510 for later use.

In some instances, the information on the whiteboard surface 405 may be imported directly into a computer-based spreadsheet 515 such as Lotus 123 (a product of IBM Corp.) or Microsoft Excel (a product of Microsoft Corp.), for example. In those instances, the location of the cursor (i.e., the highlighted cell) in the spreadsheet may be used as a reference point to determine where the data in the left-most/upper-most cell on the whiteboard surface 405 will be inserted in the spreadsheet 515. For example, based on the location of the word "platform" in the spreadsheet 515, the upper-most/left-most cell of the spreadsheet was the highlighted cell. Note that if the information on the whiteboard surface 405 were to be downloaded once more, the information in the upper-most/left-most cell on the whiteboard surface 405 would be imported into highlighted cell 520 of the spreadsheet 515. The rest of the data will be downloaded and inserted into adjacent cells as determined from the point of reference.

Consequently, the present invention allows a user to download data onto spreadsheet cells, where the current spreadsheet cell is logically mapped to data on a cell on the whiteboard, and additional spreadsheet cells that are not mapped on the electronic whiteboard can be inserted through multiple downloads (the location of the spreadsheet current cell may be automatically adjusted after every download). After each download, the user may erase the information on the electronic whiteboard and enter new information data thereon. When the information is to be downloaded, the user may move the cursor to the cell in the spreadsheet that is to correspond with the information in the left-most, top-most cell on the electronic whiteboard. After doing so, the user may assert button 530 to download the information.

Figure 6:
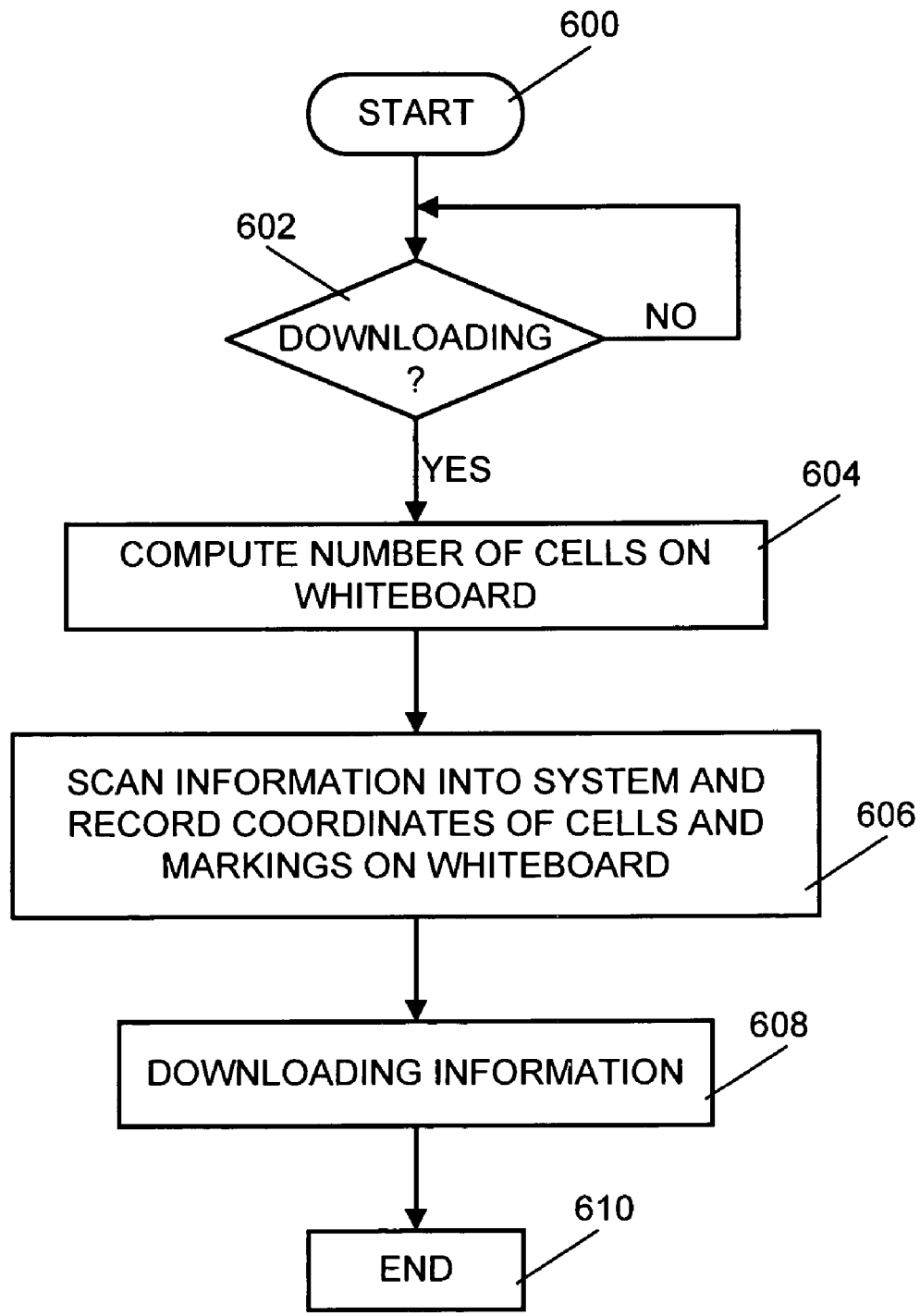
FIG. 6 is a flowchart of a process that may be used for downloading content on a whiteboard onto a computer system.

FIG. 6 is a flowchart of a process that may be used for downloading content on a whiteboard onto a computer system. The process starts when a user asserts downloading button 530 (steps 600 and 602). The content of the whiteboard is then scanned. While scanning the content, the XY coordinates of the cells, any markings on the whiteboard as well as the coordinates of the markings on the whiteboard will be recorded (steps 604 and 606). Once this is done, the recorded information will be downloaded (step 608) and the process will end (step 610).

Figure 7:
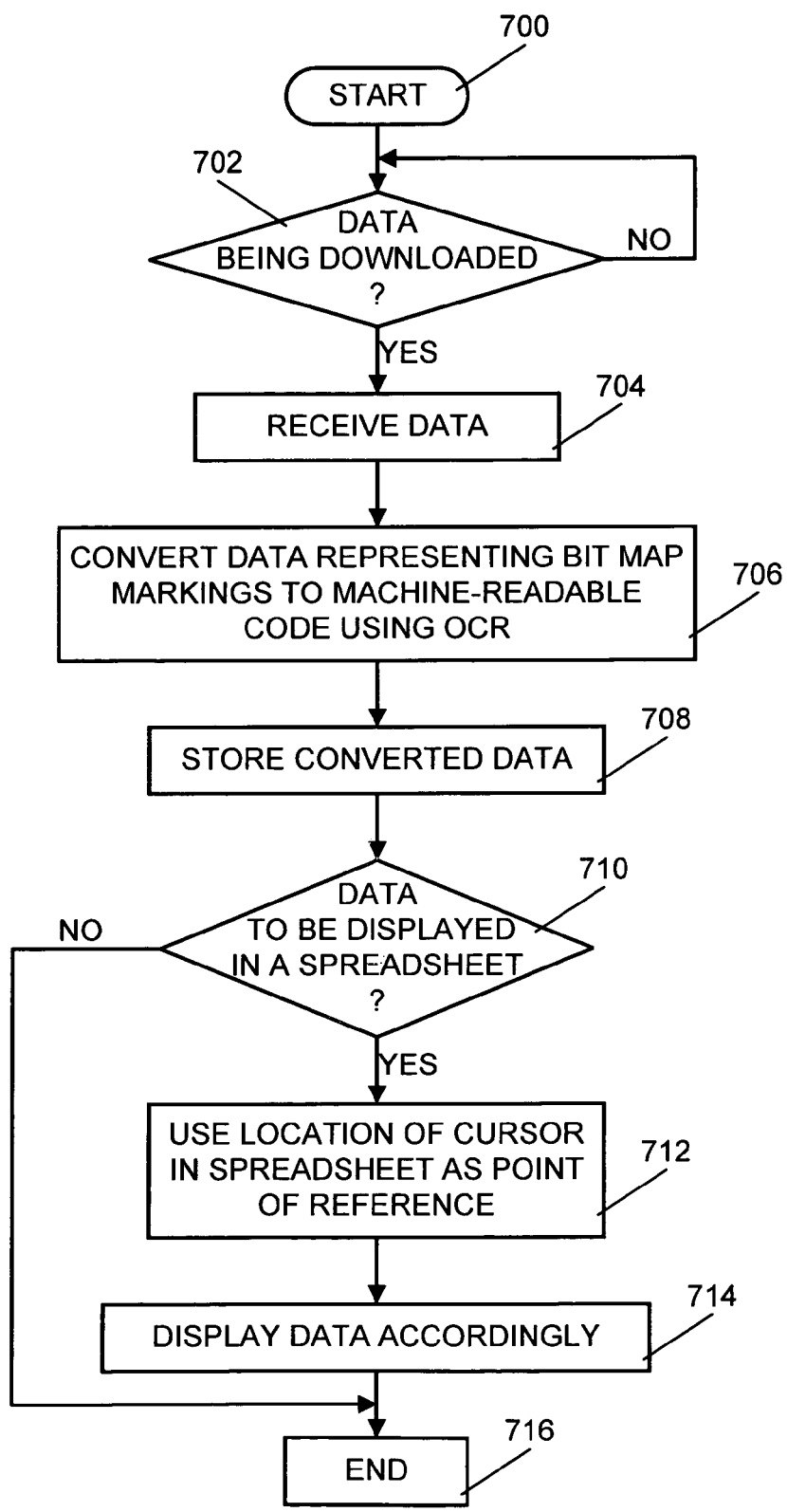
FIG. 7 is a flowchart of a process that may be used when content of a whiteboard is downloaded to a computer system.

FIG. 7 is a flowchart of a process that may be used when content of a whiteboard is downloaded to a computer system. The process starts when the whiteboard attempts to download data to the computer system (step 700). Then a check is made to determine if the data is being downloaded (step 702). If so, the computer system will accordingly receive the data. The downloaded data, as mentioned above, represents a bitmap image of all makings on the whiteboard. Consequently, the data may be converted into machine-readable code using an OCR program and the converted data will be stored for later use (steps 704, 706, 708). If the data is to be downloaded directly into a spreadsheet as when a spreadsheet is displayed on the computer system, the position of the cursor in the spreadsheet will be used as a point of reference. That is, the cell in which the cursor is located will be used to correspond to the left-most/upper-most cell of the whiteboard. The rest of the data will be displayed in appropriate cells and the process will end (steps 710, 712, 714 and 716).

Figure 8:
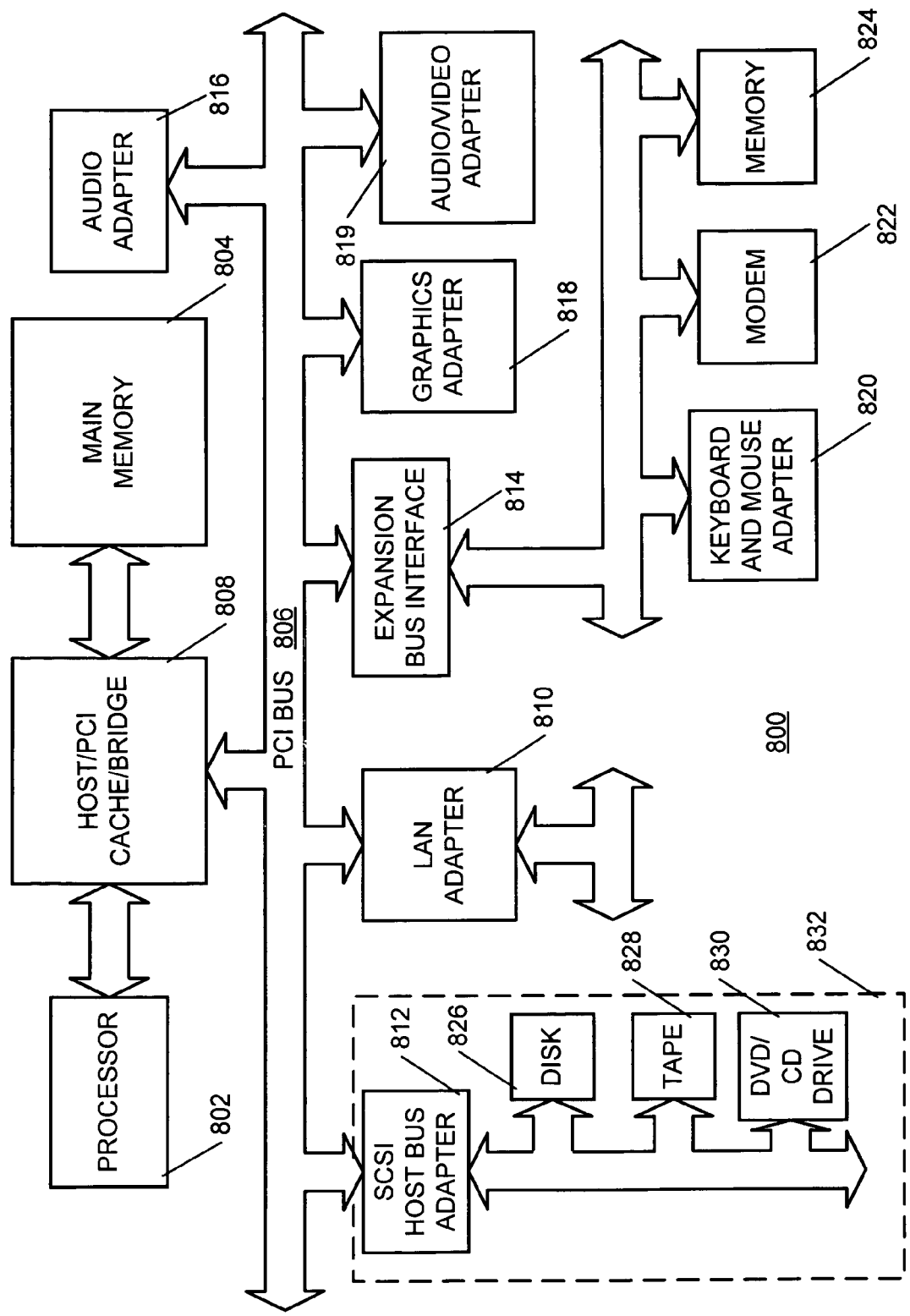
FIG. 8 depicts a block diagram illustrating a data processing system in which the present invention may be implemented.

With reference now to FIG. 8, a block diagram illustrating a data processing system in which the present invention may be implemented is depicted. Data processing system 800 employs a PCI local bus architecture. Although the depicted example employs a PCI bus, other bus architectures such as Accelerated Graphics Port (AGP) and Industry Standard Architecture (ISA) may be used. Processor 802 and main memory 804 are connected to PCI local bus 806 through PCI bridge 808. PCI bridge 808 also may include an integrated memory controller and cache memory for processor 802. Additional connections to PCI local bus 806 may be made through direct component interconnection or through add-in boards. For example, a USB board or a firewire board may be added to the system in order to implement the present invention.

Note that in the depicted example, LAN adapter 810, small computer system interface (SCSI) host bus adapter 812, and expansion bus interface 814 are connected to PCI local bus 806 by direct component connection. In contrast, audio adapter 816, graphics adapter 818, and audio/video adapter 819 are connected to PCI local bus 806 by add-in boards inserted into expansion slots. Expansion bus interface 814 provides a connection for a keyboard and mouse adapter 820, modem 822, and additional memory 824. SCSI host bus adapter 812 provides a connection for hard disk drive 826, tape drive 828, and digital video disk/compact disk (DVD/CD) drive 830. Typical PCI local bus implementations will support three or four PCI expansion slots or add-in connectors.

An operating system runs on processor 802 and is used to coordinate and provide control of various components within data processing system 800 in FIG. 8. The operating system may be a commercially available operating system, such as Windows XP, which is available from Microsoft Corporation. An object oriented programming environment such as Java may run in conjunction with the operating system and provide calls to the operating system from Java programs or applications executing on data processing system 800. "Java" is a trademark of Sun Microsystems, Inc. Instructions for the operating system, the object-oriented programming environment, and applications or programs are located on storage devices, such as hard disk drive 826, and may be loaded into main memory 804 for execution by processor 802.

Those of ordinary skill in the art will appreciate that the hardware in FIG. 8 may vary depending on the implementation. Other internal hardware or peripheral devices, such as flash read-only-memory (ROM) (or equivalent nonvolatile memory) or optical disk drives and the like, may be used in addition to or in place of the hardware depicted in FIG. 8. Also, the processes of the present invention may be applied to a multiprocessor data processing system.

As another example, data processing system 800 may be a stand-alone system configured to be bootable without relying on some type of network communication interface, whether or not data processing system 800 comprises some type of network communication interface. As a further example, data processing system 800 may be a Personal Digital Assistant (PDA) device, which is configured with ROM and/or flash ROM in order to provide non-volatile memory for storing operating system files and/or user-generated data.

The depicted example in FIG. 8 and above-described examples are not meant to imply architectural limitations. For example, data processing system 800 may also be a notebook computer or hand held computer in addition to taking the form of a PDA. Data processing system 800 also may be a kiosk or a Web appliance.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An improved electronic whiteboard comprising:
    a surface under which a substance with light-reflecting particles is contained;
    means along a vertical side for drawing horizontal lines across the electronic whiteboard, the horizontal lines drawing means including visible light reflecting off the light-reflecting particles when turned on;
    means along a horizontal side for drawing vertical lines across the electronic whiteboard, the vertical lines drawing means including visible light reflecting off the light-reflecting particles when turned on;
    means for determining when a plurality of vertical lines and a plurality of horizontal lines are drawn; and
    means for detecting grid cells created by the plurality of the vertically and the horizontally drawn lines.

2. The improved electronic whiteboard of claim 1 wherein information is entered within the grid cells.

3. The improved electronic whiteboard of claim 2 wherein the visible light is laser light.

4. The improved electronic whiteboard of claim 2 wherein the visible light is LED light.

5. A method of implementing grid cells across an electronic whiteboard, the electronic whiteboard including means along a vertical side for drawing horizontal lines and means along a horizontal side for drawing vertical lines across the electronic whiteboard, the method comprising:
    drawing vertical lines across the electronic whiteboard using the means along the horizontal side, the means along the horizontal side including means for turning on a visible light at different locations along the horizontal side, said visible light reflecting off light-reflecting particles from a substance within the electronic whiteboard to form the vertical lines when turned on;
    drawing horizontal lines across the electronic whiteboard using the means along the vertical side, the means along the vertical side including means for turning on a visible light at different locations along the vertical side, said visible light reflecting off light-reflecting particles from a substance within the electronic whiteboard to form the horizontal lines when turned on; and
    detecting grid cells created by the vertically and horizontally drawn lines.

6. The method of claim 5 wherein information is entered within the grid cells.

7. The method of claim 6 wherein the visible light is laser light.

8. The method of claim 6 wherein the visible light is LED light.

9. An electronic whiteboard system comprising:
    an electronic whiteboard having a surface under which a substance with light-reflecting particles is contained, the electronic whiteboard including:
    means along a vertical side for drawing horizontal lines across the electronic whiteboard, the horizontal lines drawing means including visible light reflecting off the light-reflecting particles when turned on;
    means along a horizontal side for drawing vertical lines across the electronic whiteboard, the vertical lines drawing means including visible light reflecting off the light-reflecting particles when turned on; and
    means for detecting grid cells on the electronic whiteboard, the detecting means including;
        at least one storage device for storing code data; and
        at least one processor for processing the code data to determine when a plurality of vertical lines and a plurality of horizontal lines are drawn across the electronic whiteboard, and to detect grid cells created by the vertically and the horizontally drawn lines.

10. The system of claim 9 wherein information is entered within the grid cells.

11. The system of claim 10 wherein the visible light is laser light.

12. The system of claim 10 wherein the visible light is LED light.

* * * * *